United States Patent
Tahir

(10) Patent No.: US 9,661,110 B2
(45) Date of Patent: May 23, 2017

(54) SYSTEM AND METHOD FOR ENABLING CHANNEL ACCESS ENHANCEMENTS IN EXISTING COMMUNICATION NETWORKS

(71) Applicant: QUALCOMM Incorporated, San Diego, CA (US)

(72) Inventor: Ehab Tahir, Mississauga (CA)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 14/622,089

(22) Filed: Feb. 13, 2015

(65) Prior Publication Data

US 2016/0241681 A1  Aug. 18, 2016

(51) Int. Cl.
*H04L 29/06* (2006.01)
*H04L 17/00* (2006.01)
*H04L 29/08* (2006.01)
*H04L 7/00* (2006.01)

(52) U.S. Cl.
CPC ............ *H04L 69/22* (2013.01); *H04L 7/00* (2013.01); *H04L 67/12* (2013.01); *H04L 69/26* (2013.01); *H04L 69/323* (2013.01)

(58) Field of Classification Search
CPC .............................. H04L 69/22; H04L 69/26
USPC ......................................................... 370/475
See application file for complete search history.

(56) References Cited

U.S. PATENT DOCUMENTS

| 4,866,702 | A | * | 9/1989 | Shimizu | H04L 12/44 370/438 |
|---|---|---|---|---|---|
| 5,721,534 | A | * | 2/1998 | Olds | H04B 7/18567 340/2.1 |
| 7,817,593 | B2 | | 10/2010 | Ginzburg et al. | |
| 8,107,493 | B2 | | 1/2012 | Kwon et al. | |
| 8,355,398 | B2 | * | 1/2013 | Biswas | H04L 12/413 370/389 |
| 8,599,735 | B2 | | 12/2013 | Hedayat et al. | |
| 2003/0012181 | A1 | * | 1/2003 | The | H04L 12/1886 370/352 |
| 2007/0053354 | A1 | * | 3/2007 | Rudolf | H04L 9/0833 370/389 |
| 2010/0091759 | A1 | | 4/2010 | Stahl et al. | |
| 2010/0150173 | A1 | | 6/2010 | Yu et al. | |
| 2011/0074552 | A1 | * | 3/2011 | Norair | G06K 7/0008 340/10.1 |
| 2011/0090855 | A1 | | 4/2011 | Kim | |
| 2013/0107912 | A1 | | 5/2013 | Ponnampalam | |
| 2013/0250904 | A1 | | 9/2013 | Kang et al. | |
| 2014/0050210 | A1 | * | 2/2014 | Waters | H04W 4/02 370/338 |

(Continued)

*Primary Examiner* — Ronald B Abelson
(74) *Attorney, Agent, or Firm* — The Marbury Law Group, PLLC

(57) ABSTRACT

Described herein is a system and method for enhanced channel access in existing communication networks. The system comprising: a first enhanced node comprising a first processor, the first processor configured to: transmit a legacy frame header of a physical layer protocol data unit (PPDU), the legacy frame header comprising an indicator indicating that sub-PPDUs will be transmitted during a duration associated with transmission of a legacy PPDU; a second enhanced node comprising a second processor configured to receive the legacy frame header; and a third enhanced node comprising a third processor configured to receive the legacy frame header.

25 Claims, 5 Drawing Sheets

(56) References Cited

U.S. PATENT DOCUMENTS

2014/0119288 A1* 5/2014 Zhu .................. H04W 74/0816
370/329
2014/0307653 A1* 10/2014 Liu ..................... H04B 7/2612
370/329

* cited by examiner

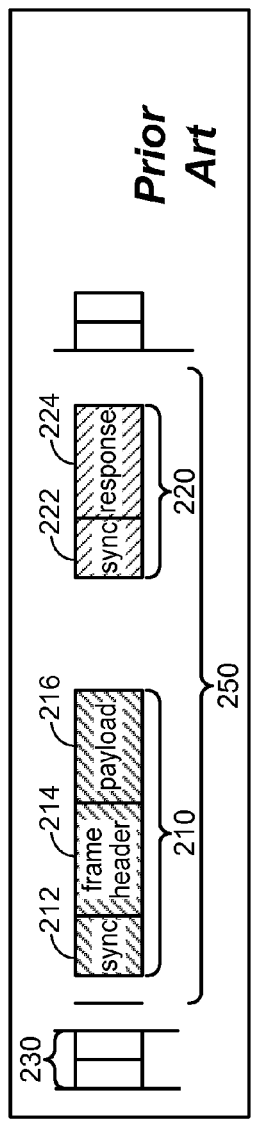
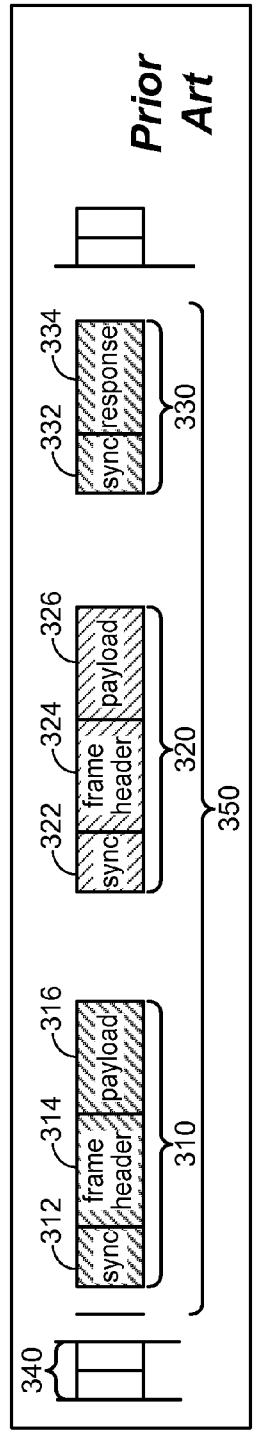
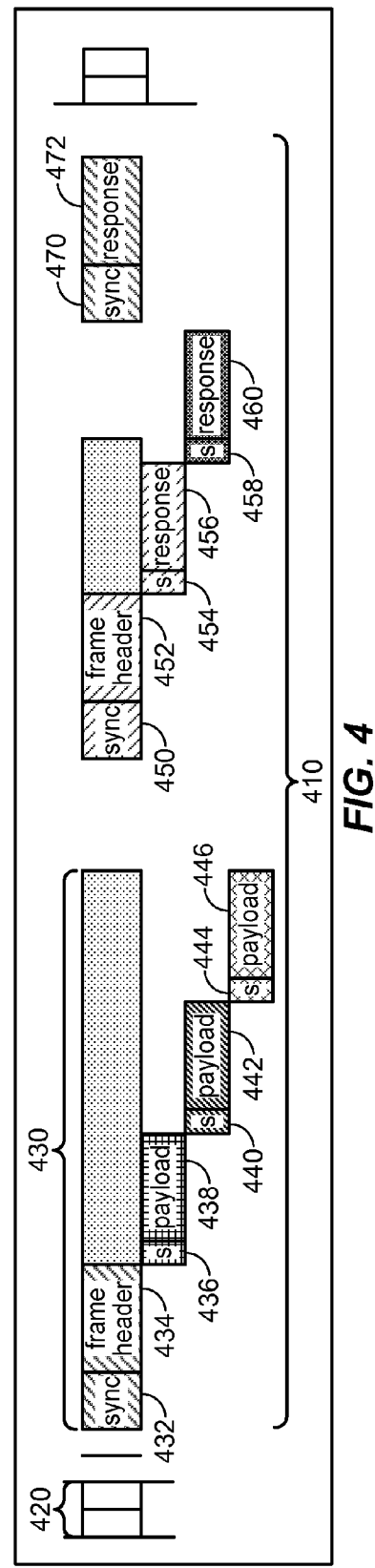

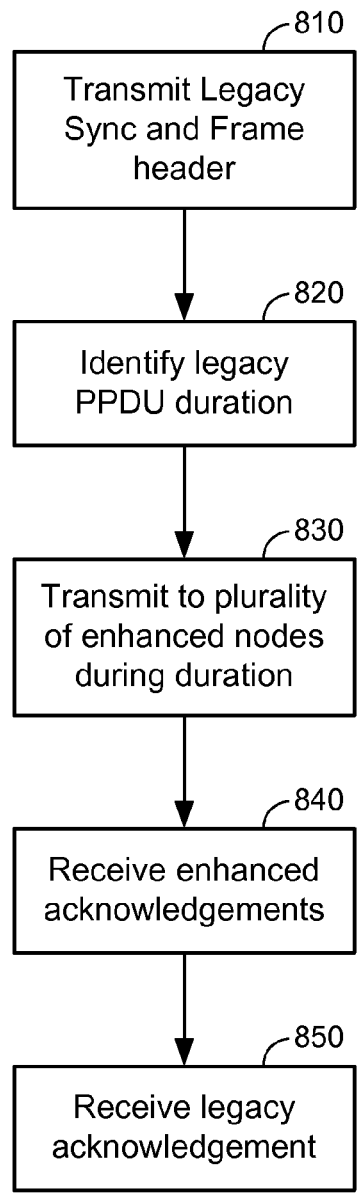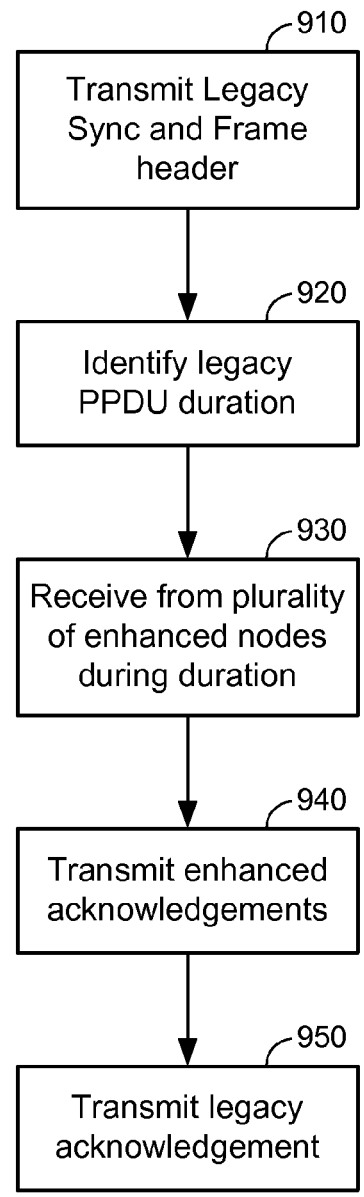
FIG. 8
FIG. 9

SYSTEM AND METHOD FOR ENABLING CHANNEL ACCESS ENHANCEMENTS IN EXISTING COMMUNICATION NETWORKS

TECHNICAL FIELD

The present application generally relates to communications between networked devices, more specifically, to systems and methods for enabling channel access enhancements in existing communication networks.

BACKGROUND

Networked nodes typically communicate with one another using a communication protocol, for example the 802.11 series of protocols commonly known as WiFi, HomePlug® protocols for power-line communication, or other protocols for communication between nodes. Some protocols are contention based allowing many nodes to share a single communication medium. Contention based protocols may transmit data on the communication medium using protocol data units (PDU). In a contention based protocol using the open systems interconnection (OSI) model, various layers may have PDUs associated with them. Each PDU may require header information or other overhead information to allow transmission of the PDU. Each transmission on the communication medium incurs a certain amount of channel access overhead, i.e., data that is not payload data for an intended recipient. Physical layer PDUs (PPDU) are typically more efficient as they increase in size, due to a decrease in the overhead required relative to the size of the payload. Therefore, multiple smaller PPDUs typically require more overhead than a single larger PPDU, thereby decreasing the efficiency of the transmission medium. However, smaller PPDUs are becoming more common as enhancements are made to communication protocols to increase maximum throughput of the communication medium. In some cases, a node may have significant impact on the overall network throughput by transmitting many small PPDUs. A node transmitting at a low rate to multiple nodes may further reduce the overall throughput by transmitting many small PPDUs to multiple nodes. Still further, nodes used as repeaters may each transmit the same PPDU multiple times, thereby incurring additional overhead with each repeat transmission and further impacting the throughput.

SUMMARY

Described herein are various embodiments of systems and methods for enabling channel access enhancements in existing communication networks. A node may communicate with other nodes using PPDUs. In legacy networks, a PPDU is transmitted between two nodes. An enhanced node described herein may transmit or receive between multiple nodes using a single enhanced PPDU. Legacy devices may recognize the enhanced PPDU and remain synchronized with the network as if the enhanced PPDU were a legacy PPDU. The enhanced PPDU may enable multiple enhanced nodes to share a single PPDU, thereby decreasing the amount of overhead that may be required for communication, as compared to using multiple legacy PPDUs.

BRIEF DESCRIPTION OF THE DRAWINGS

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

FIG. 2 is a diagram of an embodiment of a legacy point-to-point transmission;

FIG. 3 is a diagram of an embodiment of a legacy bi-directional transmission;

FIG. 4 is a diagram of an embodiment of an enhanced multi-destination transmission;

FIG. 8 is a flow diagram of an embodiment of a method for enhanced multi-destination transmissions;

FIG. 9 is a flow diagram of an embodiment of a method for enhanced multi-source transmissions;

Although similar reference numbers may be used to refer to similar elements for convenience, it can be appreciated that each of the various example embodiments may be considered distinct variations.

DETAILED DESCRIPTION

In some embodiments, efficiency of a contention based network may be improved by usage of an enhanced PPDU that comprises several smaller sub-PPDUs to be transmitted to or received from several enhanced nodes. The enhanced PPDU may be formatted similarly to a legacy PPDU to allow legacy devices to remain synchronized with the transmission medium of the network. In other words, the enhanced PPDU may appear to be a legacy PPDU to legacy nodes, while enhanced nodes recognize that the enhanced PPDU comprises sub-PPDUs for several different nodes.

Figure 1:
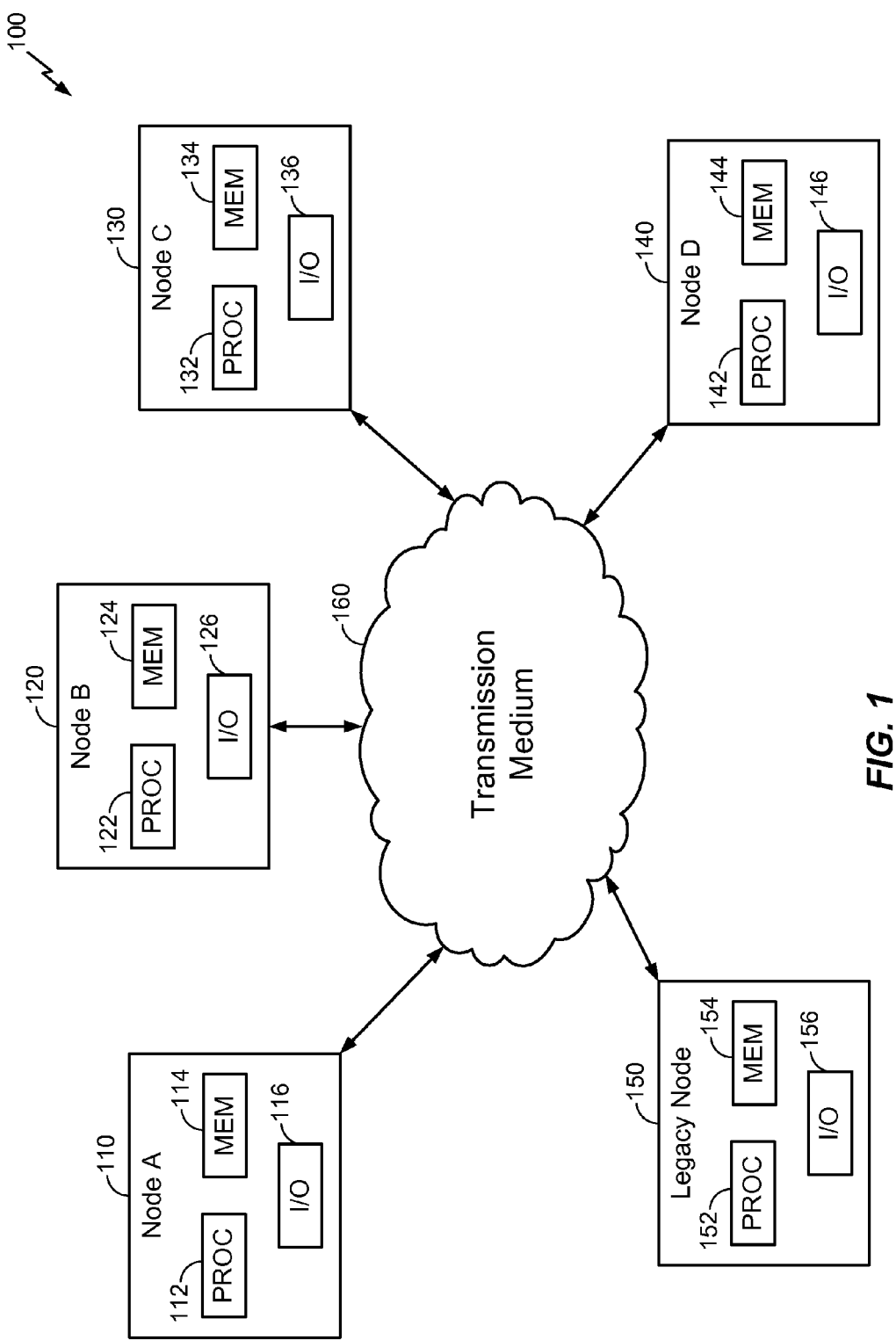
FIG. 1 is a diagram of a an embodiment of a network comprising enhanced nodes and a legacy node.

FIG. 1 is a diagram of a network 100 comprising enhanced nodes and a legacy node. Network 100 may comprise several enhanced nodes: node A 110, node B 120, node C 130, and node D 140. Network 100 may also comprise a legacy node 150 and a transmission medium 160. Node A 110 may comprise a processor 112, memory 114, and an I/O module 116. Node B 120 may comprise a processor 122, memory 124, and an I/O module 126. Node C 130 may comprise a processor 132, memory 134, and an I/O module 136. Node D 140 may comprise a processor 142, memory 144, and an I/O module 146. Legacy Node 150 may comprise a processor 152, memory 154, and an I/O module 156. Each of the nodes may communicate with one another via the transmission medium 160. While four enhanced nodes and one legacy node are depicted, embodiments may include any number of legacy and enhanced nodes. The transmission medium 160 may be wired and/or wireless in accordance with the communication protocol used by network 100.

As used herein, processors may control the functions of a node. Any actions described as being taken by a processor may be taken by the processor alone or by the processor in conjunction with one or more additional components. Additionally, while only one processor may be shown in certain devices, multiple processors may be present. Thus, while instructions may be discussed as being executed by a processor, the instructions may be executed simultaneously, serially, or otherwise by one or multiple processors. A processor may be implemented as one or more CPU chips and may be a hardware device capable of executing computer instructions. The processor may execute instructions, codes, computer programs, or scripts. The instructions, codes, computer programs, or scripts may be received from an I/O module or from memory.

As used herein, an I/O module may include modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. I/O modules may also include liquid crystal displays (LCDs), touch screen displays, keyboards, keypads, switches, dials, mice, track balls, voice recognizers, card readers, paper tape readers, printers, video monitors, or other well-known input/output devices.

As used herein, memory may include random access memory (RAM), read only memory (ROM), or various forms of secondary storage. RAM may be used to store volatile data and/or to store instructions that may be executed by a processor. ROM may be a non-volatile memory device that may have a smaller memory capacity than the memory capacity of a secondary storage. ROM may be used to store instructions and/or data that may be read during execution of computer instructions. Access to both RAM and ROM may be faster than access to secondary storage. Secondary storage may be comprised of one or more disk drives or tape drives and may be used for non-volatile storage of data or as an over-flow data storage device if RAM is not large enough to hold all working data. Secondary storage may be used to store programs that may be loaded into RAM when such programs are selected for execution.

Turning now to FIG. 2, a diagram of a legacy point-to-point transmission is provided. A legacy node 150 may determine that it may transmit based upon data contained in the priority resolution slots 230. As used herein priority resolution slots may be any identifier that indicates to a node that it may transmit during a contention period. Contention periods may be durations of time or portions of transmission medium used by nodes for transmitting. Legacy node 150 may transmit and receive during contention period 250. During contention period 250, legacy node 150 may transmit a PPDU 210 to a second node, for example, node A 110. PPDU 210 may comprise a sync portion 212, a frame header 214, and a payload 216. As used herein sync portion may be data used by a node to remain synchronized with a network. Frame headers may contain data used for routing payloads, identifying types of payloads, and or other header data. Upon receiving PPDU 210, node A 110 may transmit an acknowledgment PPDU 220. Acknowledgment PPDU 220 may comprise a sync portion 222 and a response portion 224. Each time a legacy node transmits, the transmission may include a sync and header portion. If multiple nodes are transmitting relatively small payloads, then the many sync portions and frame headers required for each PPDU may result in inefficient use of the transmission channel.

In some legacy systems, efficiency may be increased by transmitting payload rather than an acknowledgment PPDU as shown in FIG. 3. FIG. 3 is a diagram of a legacy bi-directional transmission. In this case, communication of payloads may occur between a pair of nodes during a contention period 350 assigned to one of the nodes. After a legacy node 150 determines it may transmit based on priority resolution 340, the legacy node 150 may transmit a PPDU 310 to node A 110, or some other node. PPDU 310 may comprise a sync portion 312, a frame header 314, and a payload 316. In response to the PPDU 310 from the legacy node 150, node A 110 (or some other node that receives the PPDU 310) may transmit a responsive PPDU 320. Responsive PPDU 320 comprises a sync portion 322, frame header 324, and payload 326. In this case, the responsive PPDU 320, indicates to the legacy node 150, that node A 110 has received the initial transmission from legacy node 150. The responsive PPDU functions as an acknowledgment while also delivering payload, i.e., the payload and ACK are piggybacked. Lastly, legacy node 150 may transmit an acknowledgment PPDU 330 to node A 110 to indicate that legacy node 150 has received the transmission from node A 110. Acknowledgment PPDU 330 may comprise a sync portion 332 and a response portion 334.

FIG. 4 is a diagram of an enhanced multi-destination transmission. An enhanced node, for example node A 110, may determine that it may transmit during contention period 410 based upon priority resolution indictors 420. A legacy PPDU may occupy the timing indicated by duration 430. During duration 430, node A may transmit a sync portion 432 and frame header 434. Sync portion 432 and frame header 434 may appear as a legacy PPDU to legacy nodes. However, frame header 434 may utilize a legacy field and/or indicator to indicate to other enhanced nodes that an enhanced PPDU is being transmitted. For example, the source and destination address in the frame header 434 may be set to the same value. In this case, a legacy node would ignore the PPDU because the destination address is not the address of the legacy PPDU. However, an enhanced node would check both the source address and destination address to see if they match. In the case where the source address and destination address match, the enhanced node would further read the enhanced PPDU to determine if there is a sub-PPDU addressed to it within the enhanced PPDU. While source address and destination address are used in this example, other embodiments may use other existing fields or indicators within the frame header 434 to indicate the presence of sub-PPDUs.

After transmitting frame header 434, node A 110 may transmit a sub-PPDU comprising a sync portion 436 and payload 438 to node B 120. While sync portion 436 is pictured here, certain embodiments may not require sync portion 436. In those embodiments, node B 120 may use the sync information provided in sync portion 432 instead. Node A 110 may then transmit a sub-PPDU comprising a sync portion 440 and payload 442 to node C 130. While sync portion 440 is pictured here, certain embodiments may not require sync portion 440. In those embodiments node C 130 may use the sync information provided in sync portion 432 instead. Node A 110 may then transmit a sub-PPDU comprising a sync portion 444 and payload 446 to node D 140. While sync portion 444 is pictured here, certain embodiments may not require sync portion 444. In those embodiments, node D 140 may use the sync information provided in sync portion 432 instead. While FIG. 4 shows an embodiment where a node is transmitting to three enhanced nodes, the node may transmit to any number of enhanced and/or legacy nodes.

Upon receiving payload 438, node B 120 may transmit sync portion 450 and frame header 452. Sync portion 450 and frame header 452 may be compatible with legacy nodes and may identify that enhanced PPDUs may be transmitted as previously described. Node B 120 may then transmit a sub-PPDU comprising sync portion 454 and response portion 456 as an acknowledgment that payload 438 was received. Node C 130 may then transmit a sub-PPDU comprising sync portion 458 and response portion 460 as an acknowledgment that payload 442 was received. Node D 140 may then transmit sync portion 470 and response portion 472 as an acknowledgment that payload 446 was received. Sync portion 470 and frame header 452 may be compatible with legacy nodes and may indicate the end of contention period 410, and may further allow legacy nodes to remain synchronized.

Figure 5:
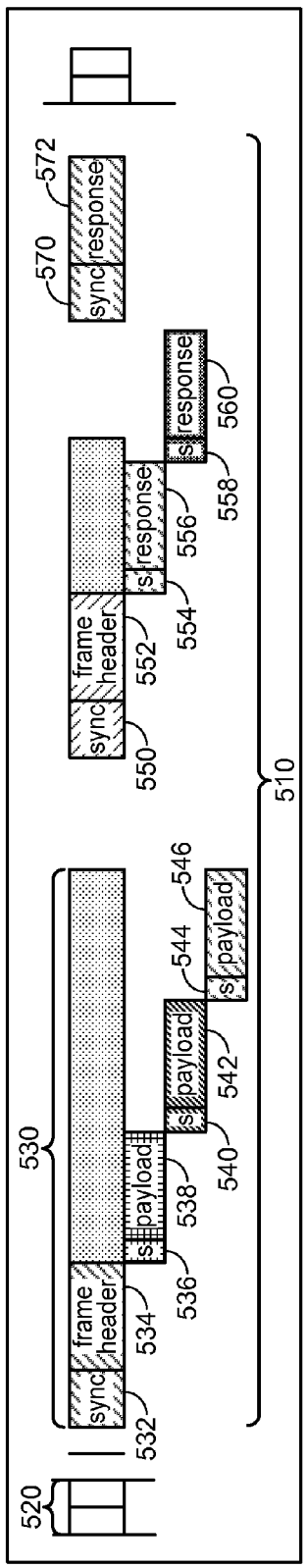
FIG. 5 is a diagram of an embodiment of an enhanced multi-source transmission.

FIG. 5 is a diagram of an enhanced multi-source transmission. An enhanced node, for example node A 110, may determine that it may transmit during contention period 520 based upon priority resolution indictors 510. A legacy PPDU may occupy the timing indicated by duration 530. During duration 530, node A 110 may transmit a sync portion 532 and frame header 534. Sync portion 532 and frame header 534 may appear as a legacy PPDU to legacy nodes. However, frame header 534 may utilize a legacy field and/or indicator to indicate to other enhanced nodes that an enhanced PPDU is being used and that the enhanced nodes may transmit sub-PPDUs to node A 110 during duration 530. Multiple enhanced nodes may transmit to node A 110 based upon data contained in frame header 534 or based upon some other predetermined timing sequence.

After receiving frame header 534, node B 120 may transmit a sub-PPDU comprising sync portion 536 and payload 538 to node A 110. After receiving frame header 534, node C 130 may transmit a sub-PPDU comprising sync portion 540 and payload 542 to node A 110. After receiving frame header 534, node D 140 may transmit a sub-PPDU comprising sync portion 544 and payload 546 to node A 110.

Node A 110 may acknowledge receipt of the payloads 538, 542, 546. Node A 110 may transmit sync portion 550 and frame header 552. Sync portion 550 and frame header 552 may be compatible with legacy nodes and may identify that enhanced PPDUs may be transmitted to or from node A 110 as previously described. Node A 110 may then transmit acknowledgment that payload 538 was received from node B 120 using a sub-PPDU comprising sync portion 554 and response portion 556. Node A 110 may then transmit acknowledgment that payload 542 was received from node C 130 using a sub-PPDU comprising sync portion 558 and response portion 560. Node A 110 may then transmit sync portion 570 and response portion 572 as an acknowledgment that payload 546 was received. Sync portion 570 and frame header 552 may be compatible with legacy nodes and may indicate the end of contention period 520.

Figure 6:
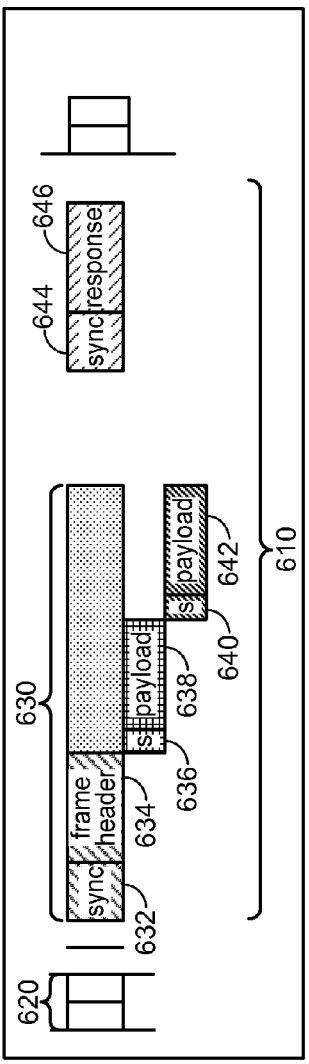
FIG. 6 is a diagram of an embodiment of an enhanced repeating transmission.

FIG. 6 is a diagram of an enhanced repeating transmission. An enhanced node, for example node A 110, may determine that it may transmit during contention period 610 based upon priority resolution indictors 620. A legacy PPDU may occupy the timing indicated by duration 630. During duration 630, node A 110 may transmit a sync portion 632 and frame header 634. Sync portion 632 and frame header 634 may appear as a legacy PPDU to legacy nodes. However, frame header 634 may utilize a legacy field and/or indicator to indicate to other enhanced nodes that an enhanced PPDU is being used to facilitate a repeating transmission. A repeating transmission may be used when a node that is not the intended recipient of a transmission is used to repeat the transmission to the intended recipient.

After transmitting frame header 634, node A 110 may transmit a sub-PPDU comprising sync portion 636 and payload 638 to node C 130. In this case, the payload 638 may be intended to be delivered to node B 120, using node C 130 as a repeater. After node C 130 receives payload 638, node C 130 may transmit a sub-PPDU comprising sync 640 and payload 642 to node B 120. Payload 642 may be the same as payload 638. Upon receiving payload 642, node B 120 may transmit sync portion 644 and response 646 to node A 110 and/or node C 130 as an acknowledgment of receiving payload 642.

Figure 7:
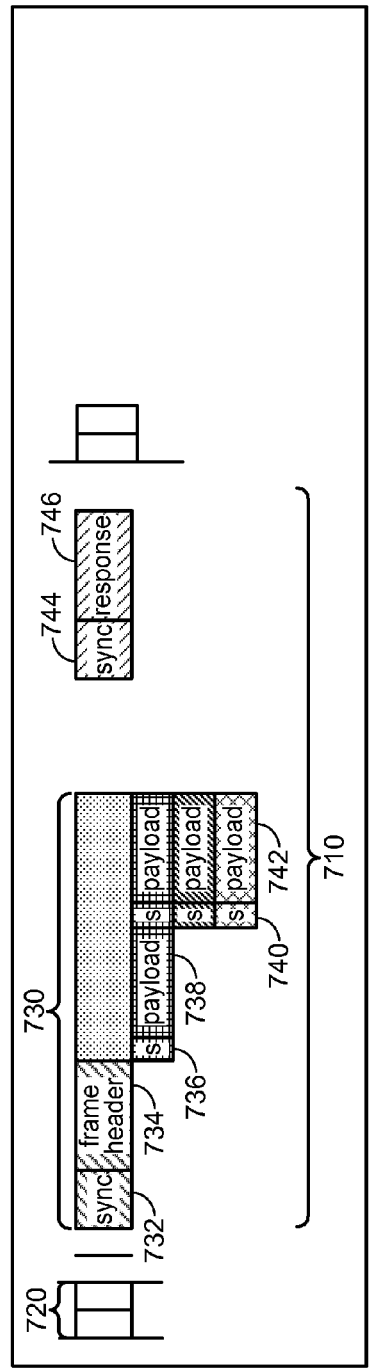
FIG. 7 is a diagram of an embodiment of an enhanced repeating transmission using constructive interference.

FIG. 7 is a diagram of an enhanced repeating transmission using constructive interference. An enhanced node, for example node A 110, may determine that it may transmit during contention period 710 based upon priority resolution indictors 720. A legacy PPDU may occupy the timing indicated by duration 730. During duration 730, node A 110 may transmit a sync portion 732 and frame header 734. Sync portion 732 and frame header 734 may appear as a legacy PPDU to legacy nodes. However, frame header 734 may utilize a legacy field and/or indicator to indicate to other enhanced nodes that an enhanced PPDU is being used to facilitate a repeating transmission using constructive interference. As described above, a repeating transmission may be used when a node that is not the intended recipient of a transmission is used to repeat the transmission to the intended recipient. Constructive interference may occur when multiple nodes transmit the same transmission simultaneously. Thereby increasing the perceived transmission strength of the intended recipient.

After transmitting frame header 734, node A 110 may transmit a sub-PPDU comprising sync portion 736 and payload 738 to node C 130 and node D 140. In this case, the payload 738 is intended to be delivered to node B 120, using node C 130 and node D 140 as repeaters. After node C 130 and node D 140 received payload 638, node C 130, node D 140, and node A 110 may each simultaneously transmit a sub-PPDU comprising sync portion 740 followed by payload 742 to node B 120. Payload 742 may be the same as payload 738. Upon receiving payload 742, node B 120 may transmit sync portion 744 and response 746 to node A 110 and/or node C 130 and/or node D 140 as an acknowledgment of receiving payload 742.

FIG. 8 is a flow diagram of an embodiment of a method for enhanced multi-destination transmissions. The flow begins at step 810 when an enhanced node may transmit a legacy sync portion and a legacy frame header to a plurality of nodes within a network. The legacy frame header may comprise information to allow legacy nodes in the network to remain synchronized. The frame header may also comprise information indicating to enhanced nodes that a multi-destination PPDU may be transmitted comprising one or more sub-PPDUs. At step 820, the enhanced nodes and/or legacy nodes in the network may determine a legacy PPDU duration. The legacy PPDU duration may be a predetermined transmission duration assigned to a legacy PPDU transmitted within the network.

At step 830, the enhanced node may transmit to a plurality of other enhanced nodes during the legacy PPDU duration using a plurality of sub-PPDUs. Each sub-PPDU transmitted by the enhanced node may be transmitted to a different enhanced node. The other enhanced nodes may know when their respective sub-PPDUs are transmitted based upon information contained in the frame header. This information may be found in fields of the frame header that are not needed by legacy devices.

At step 840, the enhanced node may receive enhanced acknowledgments from the other enhanced nodes, all but one of the other enhanced nodes may transmit acknowledgments using a piggyback ACK scheme or some other scheme allowing multiple acknowledgment to be transmitted in sub-PPDUs. At step 850, the enhanced node may receive a legacy acknowledgment from the last other enhanced node. Reception of the legacy acknowledgment enables legacy nodes in the network to remain synchronized.

FIG. 9 is a flow diagram of an embodiment of a method for enhanced multi-source transmissions. The flow begins at step 910 when an enhanced node may transmit a legacy sync portion and a legacy frame header to a plurality of nodes within a network. The legacy frame header may comprise information to allow legacy nodes in the network to remain synchronized. The frame header may also comprise information indicating to enhanced nodes that a multi-source PPDU may be transmitted comprising one or more sub-PPDUs. At step 920, the enhanced nodes and/or legacy nodes in the network may determine a legacy PPDU duration. The legacy PPDU duration may be a predetermined transmission duration assigned to a legacy PPDU transmitted within the network.

At step 930, the enhanced node may receive several sub-PPDUs from other enhanced nodes during the legacy PPDU duration. Each sub-PPDU received by the enhanced node may be received from a different enhanced node. The other enhanced nodes may know when their respective sub-PPDUs are to be transmitted based upon information contained in the frame header. This information may be found in fields of the frame header that are not needed by legacy devices.

At step 940, the enhanced node may transmit enhanced acknowledgments to the other enhanced nodes, all but one of the other enhanced nodes may receive enhanced acknowledgments using a piggyback ACK scheme or some other scheme allowing multiple acknowledgments to be transmitted in sub-PPDUs. At step 950, the enhanced node may transmit a legacy acknowledgment to the last other enhanced node. Transmission of the legacy acknowledgment enables legacy nodes in the network to remain synchronized.

Figure 10:
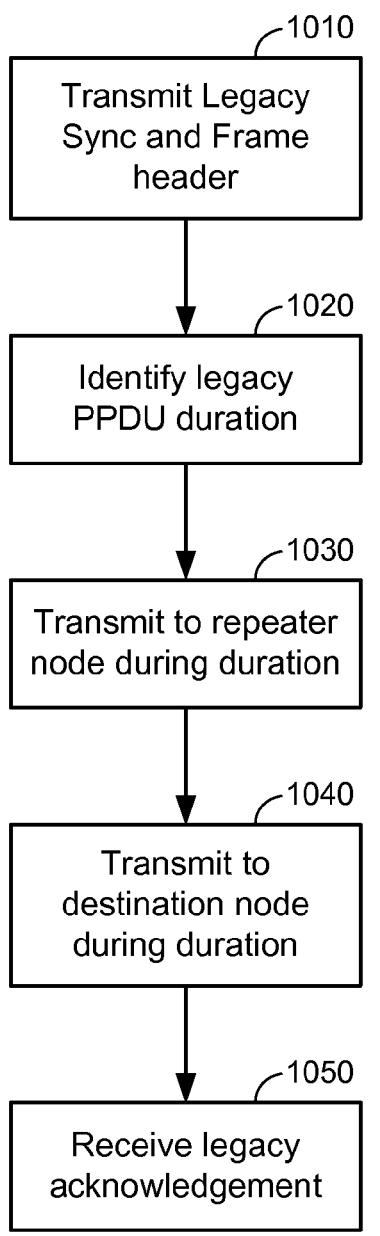
FIG. 10 is a flow diagram of an embodiment of a method for enhanced repeating transmissions.

FIG. 10 is a flow diagram of an embodiment of a method for enhanced repeating transmissions. The flow begins at step 1010 when an enhanced node may transmit a legacy sync portion and a legacy frame header to a plurality of nodes within a network. The legacy frame header may comprise information to allow legacy nodes in the network to remain synchronized. The frame header may also comprise information indicating to enhanced nodes that a multi-source PPDU may be transmitted comprising one or more sub-PPDUs. At step 1020, the enhanced nodes and/or legacy nodes in the network may determine a legacy PPDU duration. The legacy PPDU duration may be a predetermined transmission duration assigned to a legacy PPDU transmitted within the network.

At step 1030, the enhanced node may transmit a sub-PPDU to a repeater enhanced node. After receiving the sub-PPDU at the repeater enhanced node, the repeater enhanced node may transmit a sub-PPDU comprising payload identical to the received sub-PPDU to the destination enhanced node. Each sub-PPDU may be transmitted during the legacy PPDU duration. The destination enhanced node may transmit a legacy acknowledgment at step 1050 to indicate successful reception of the sub-PPDU. Transmission of the legacy acknowledgment enables legacy nodes in the network to remain synchronized.

Figure 11:
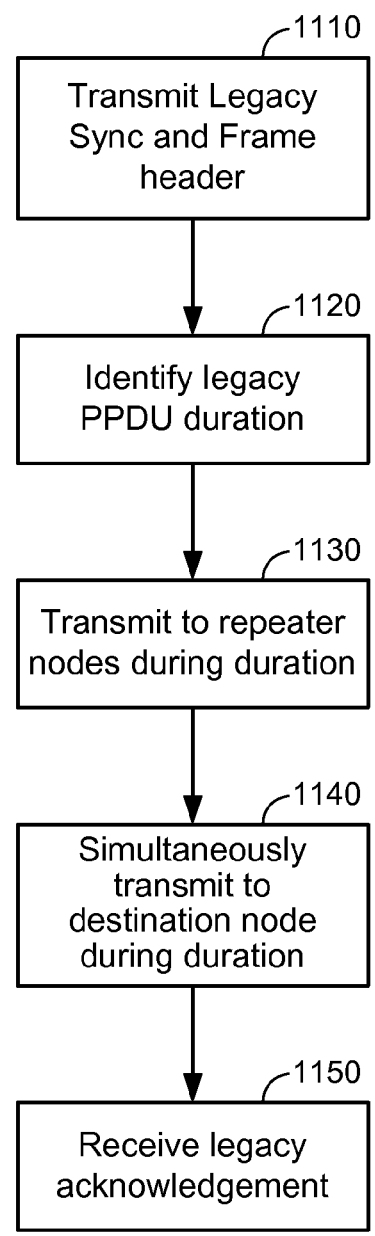
FIG. 11 is a flow diagram of an embodiment of a method for enhanced repeating transmissions.

FIG. 11 is a flow diagram of an embodiment of a method for enhanced repeating transmissions. The flow begins at step 1110 when an enhanced node may transmit a legacy sync portion and a legacy frame header to a plurality of nodes within a network. The legacy frame header may comprise information to allow legacy nodes in the network to remain synchronized. The frame header may also comprise information indicating to enhanced nodes that a multi-source PPDU may be transmitted comprising one or more sub-PPDUs. At step 1120, the enhanced nodes and/or legacy nodes in the network may determine a legacy PPDU duration. The legacy PPDU duration may be a predetermined transmission duration assigned to a legacy PPDU transmitted within the network.

At step 1130, the enhanced node may transmit a sub-PPDU to several repeater enhanced nodes. After receiving the sub-PPDU at the repeater enhanced nodes, the repeater enhanced nodes may simultaneously transmit a sub-PPDU comprising payload identical to the received sub-PPDU to the destination enhanced node. Each sub-PPDU may be transmitted during the legacy PPDU duration. The destination enhanced node may transmit a legacy acknowledgment at step 1050 to indicate successful reception of the sub-PPDU. Transmission of the legacy acknowledgment enables legacy nodes in the network to remain synchronized. Simultaneous transmission of the sub-PPDUs may result in constructive interference.

As used herein, networks may represent any form of communication network between connected machines and any other network elements, and may also represent a collection of machines or virtual machines operable to provide cloud computing services to users. Networks may include a public cloud or a private cloud. Networks may include routers, hubs, switches, firewalls, content switches, gateways, call controllers, and/or any other suitable components in any suitable form or arrangement. Networks may include, in whole or in part, one or more secured and/or encrypted Virtual Private Networks (VPNs) operable to couple one or more network elements together by operating or communicating over elements of a public or external communication network.

Nodes may include any device with a network interface, which includes, but is not limited to, network components, desktop computers, laptops, or mobile devices. A node may be a virtual machine, computer, device, instance, host, or machine in a networked computing environment.

While various embodiments in accordance with the disclosed principles have been described above, it should be understood that they have been presented by way of example only, and are not limiting. Thus, the breadth and scope of the embodiments should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the embodiments set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any embodiments in this disclosure. Neither is the "Summary" to be considered as a characterization of the embodiments set forth in issued claims. Furthermore, any reference in this disclosure to "embodiment" in the singular should not be used to argue that there is only a single point of novelty in this disclosure. Multiple embodiments may be set forth according to the limitations of the multiple claims issuing from this disclosure, and such claims accordingly define the embodiments, and their equivalents, that are protected thereby. In all instances, the scope of such claims shall be considered on their own merits in light of this disclosure, but should not be constrained by the headings herein.

What is claimed is:

1. An enhanced communication node comprising:
an I/O module; and
a processor coupled to the I/O module; the processor configured to:
transmit, via the I/O module, a frame header compatible with a legacy physical layer protocol data unit (PPDU), the frame header comprising an indicator indicating that sub-PPDUs for other enhanced communication nodes will be transmitted by the enhanced communication node during a duration associated with transmission of the legacy PPDU; and
during the duration associated with transmission of the legacy PPDU:
transmit, via the I/O module at a time provided in the frame header for a first other enhanced communication node, a first sub-PPDU to the first other enhanced communication node, wherein the first sub-PPDU comprises a first payload; and
transmit, via the I/O module at a time provided in the frame header for a second other enhanced communication node, a second sub-PPDU to the second other enhanced communication node, wherein the second sub-PPDU comprises a second payload.

2. The enhanced communication node of claim 1, wherein the processor is further configured to:
receive, via the I/O module from the first other enhanced communication node, a second frame header compatible with a second legacy PPDU, wherein the second frame header has a second indicator indicating that sub-PPDUs will be transmitted as acknowledgments;
receive, via the I/O module from the first other enhanced communication node, a third sub-PPDU comprising a first acknowledgment; and
receive, via the I/O module from the second other communication node, a second acknowledgment during the second legacy PPDU.

3. The enhanced communication node of claim 1, wherein the processor is further configured to receive, via the I/O module, a plurality of sub-PPDUs from the other enhanced communication nodes.

4. The enhanced communication node of claim 3, wherein the processor is further configured to:
transmit, via the I/O module, a second frame header compatible with a second legacy PPDU, wherein the second frame header includes a second indicator indicating that sub-PPDUs will be transmitted as acknowledgments during a duration associated with transmission of the second legacy PPDU; and
transmit, via the I/O module during the duration associated with transmission of the second legacy PPDU, a second plurality of sub-PPDUs each comprising a first acknowledgment.

5. The enhanced communication node of claim 4, wherein the processor is further configured to transmit, via the I/O module during the duration associated with transmission of the second legacy PPDU, a second acknowledgment to one of the other enhanced communication nodes.

6. The enhanced communication node of claim 1, wherein the first sub-PPDU further comprises a first sync portion, and wherein the second sub-PPDU further comprises a second sync portion.

7. An enhanced communication node comprising:
an I/O module; and
a processor coupled to the I/O module, the processor configured to:
receive, via the I/O module, a frame header compatible with a legacy physical layer protocol data unit (PPDU), the frame header comprising an indicator indicating that sub-PPDUs of at least one other enhanced communication node will be transmitted during a duration associated with transmission of the legacy PPDU; and
receive, via the I/O module during the duration associated with transmission of the legacy PPDU, a first sub-PPDU, wherein the first sub-PPDU comprises a payload.

8. The enhanced communication node of claim 7, wherein the processor is further configured to:
transmit, via the I/O module, a second frame header compatible with a second legacy PPDU, wherein the second frame header has a second indicator indicating that sub-PPDUs will be transmitted as acknowledgments during a duration associated with transmission of the second legacy PPDU; and
transmit, via the I/O module during the duration associated with transmission of the second legacy PPDU, a second sub-PPDU comprising an acknowledgment.

9. The communication node of claim 7, wherein the processor is further configured to:
  transmit, via the I/O module during the duration associated with transmission of the legacy PPDU, a second sub-PPDU; and
  receive, via the I/O module, a second frame header compatible with a second legacy PPDU, wherein the second frame header has a second indicator indicating that sub-PPDUs will be transmitted as acknowledgments; and
  receive, via the I/O module, a third sub-PPDU comprising an acknowledgment.

10. The enhanced communication node of claim 7, wherein:
  the first sub-PPDU is received from a first of the at least one other enhanced communication node; and
  the first sub-PPDU comprises a payload for a second of the at least one other enhanced communication node.

11. The enhanced communication node of claim 10, wherein the processor is further configured to transmit, via the I/O module during the duration associated with transmission of the legacy PPDU, a second sub-PPDU to the second of the at least one other enhanced communication node, the second sub-PPDU comprising the payload for the second of the at least one other enhanced communication node.

12. The enhanced communication node of claim 10, wherein the processor is further configured to:
  coordinate simultaneous transmission with a third of the at least one other enhanced communication node; and
  transmit, via the I/O module and simultaneously with the third of the at least one other enhanced communication node, a second sub-PPDU to the second of the at least one other enhanced communication node during the duration associated with transmission of the legacy PPDU, the second sub-PPDU comprising the payload for the second of the at least one other enhanced communication node.

13. The enhanced communication node of claim 7, wherein the first sub-PPDU further comprises a sync portion.

14. A method for multi-destination physical layer protocol data unit (PPDU) communication, the method comprising:
  transmitting, by an enhanced communication node, a frame header compatible with a legacy PPDU, the frame header comprising an indicator indicating that sub-PPDUs for at least one other enhanced communication node will be transmitted during a duration associated with transmission of the legacy PPDU; and
  during the duration associated with transmission of the legacy PPDU:
    transmitting, by the enhanced communication node, a first sub-PPDU to a first of the at least one other enhanced communication node, the first sub-PPDU comprising a first payload;
    transmitting, by the communication node, a second sub-PPDU to a second of the at least one other enhanced communication node, the second sub-PPDU comprising a second payload; and
    receiving, from the at least one other enhanced communication node, a plurality of sub-PPDUs.

15. The method of claim 14, further comprising:
  receiving, from the first of the at least one other enhanced communication node, a second frame header comprising a second indicator indicating that sub-PPDUs will be transmitted as acknowledgments;
  receiving, from the first of the at least one other enhanced communication node, a third sub-PPDU comprising a first acknowledgment; and
  receiving, from the second of the at least one of the other enhanced communication node, a second acknowledgment.

16. The method of claim 14, further comprising:
  transmitting, by the enhanced communication node, a second frame header compatible with a second legacy PPDU, wherein the second frame header includes a second indicator indicating that sub-PPDUs will be transmitted as acknowledgments during a duration associated with transmission of the second legacy PPDU; and
  transmitting, by the enhanced communication node during the duration associated with transmission of the second legacy PPDU, a plurality of sub-PPDUs each comprising a first acknowledgment.

17. The method of claim 16 further comprising:
  transmitting, by the enhanced communication node during the duration associated with transmission of the second legacy PPDU, a second acknowledgment to the at least one other enhanced communication node.

18. The method of claim 14, wherein the first sub-PPDU further comprises a first sync portion, and wherein the second sub-PPDU further comprises a second sync portion.

19. A method for multi-source physical layer protocol data unit (PPDU) communication, the method comprising:
  receiving, at an enhanced communication node, a frame header compatible with a legacy PPDU, the frame header comprising an indicator indicating that sub-PPDUs of at least one other enhanced communication node will be transmitted during a duration associated with transmission of the legacy PPDU;
  receiving, at the enhanced communication node during the duration associated with transmission of the legacy PPDU, a first sub-PPDU comprising a payload;
  transmitting, by the enhanced communication node, a frame header compatible with a second legacy PPDU, wherein the second frame header includes a second indicator indicating that sub-PPDUs will be transmitted as acknowledgments; and
  transmitting, by the enhanced communication node, a second sub-PPDU comprising an acknowledgment.

20. The method of claim 19, wherein the received first sub-PPDU further comprises a sync portion.

21. The method of claim 19 further comprising:
  transmitting, by the enhanced communication node during the duration associated with transmission of the second legacy PPDU, a third sub-PPDU;
  receiving, at the enhanced communication node, a third frame header compatible with a third legacy PPDU, wherein the third frame header has a third indicator indicating that sub-PPDUs will be transmitted as acknowledgments; and
  receiving, at the enhanced communication node, a fourth sub-PPDU comprising an acknowledgment.

22. The method of claim 19, wherein:
  the first sub-PPDU is received from a first of the at least one other enhanced communication node during the duration associated with transmission of the legacy PPDU; and
  the payload of the received first sub-PPDU comprises a payload for a second of the at least one other enhanced communication node.

23. The method of claim 22, further comprising:
transmitting, by the enhanced communication node during the duration associated with transmission of the legacy PPDU, a third sub-PPDU to the second of the at least one other enhanced communication node, the third sub-PPDU comprising the payload for the second of the at least one other enhanced communication node.

24. The method of claim 22, further comprising:
coordinating simultaneous transmission with a third of the at least one other enhanced communication node; and
transmitting, simultaneously with the third of the at least one other enhanced communication node, a third sub-PPDU to the second of the at least one other enhanced communication node during the duration associated with transmission of the legacy PPDU, the third sub-PPDU comprising the payload for the second of the at least one other enhanced communication node.

25. The method of claim 19, wherein the first sub-PPDU further comprises a sync portion.

* * * * *